United States Patent Office 3,257,274
Patented June 21, 1966

---

3,257,274
METHOD FOR KILLING FUNGI WITH BETA-AMINO-ETHYL KETONES
Nicola Loprieno, Pisa, Emilio Plastino, Florence, and Araldo Bugiani and Ivan Tenerini, Signa, Italy, assignors to Montecatini Società Generale per l'Industria Mineraria e Chimica, Milan, Italy, a corporation of Italy
No Drawing. Filed Apr. 25, 1961, Ser. No. 105,277
Claims priority, application Italy Apr. 26, 1960
8 Claims. (Cl. 167—33)

This invention relates to beta-aminoethylaryl ketone fungicides having a presentive activity by contact and by fumigation and/or an endophytotherapeutic and immunizing activity.

The protection of agrarian cultures against pathogenic agents belonging to the vegetal kingdom (fungi, bacteria) has heretofore been effected mainly by means of parasiticidal chemical compounds exerting a preventive surface or "covering" action. In addition to the classical fungicides on the basis of copper, sulfur and mercury, fungicides on the basis of new organic compounds have recently been utilized. As is known, dithiocarbamates have assumed a prominent position among those organic fungicides. This was due to their high activity, easy application, absence of phytotoxicity and above all because they made the production of fungicides economical by rendering it independent of the uncertain copper supply. It is also known that while the introduction of the new acupric fungicides represented considerable progress in the field of phytoiatry, several technical and economical problems are still open.

With covering fungicides having preventive contact action, farmers have to keep the plants constantly covered with a film of fungicidal active ingredient, starting the treatments before infestation occurs and renewing, by frequent applications, the protective layer throughout the entire period during which infections can occur; this period almost always coincides with the entire vegetative stage.

Disregarding the effect of atmospheric factors on the degradation and removal of the active ingredient, the repetition of the treatments is particularly necessary in the springtime when plants exert an intense growth activity, in order to protect the plants as they grow. When we also consider that in some stages of the vegetative cycle of the agrarian culture, rainfall, continuous or intermittent, prohibits the covering treatments while at the same time being extremely favorable for the propagation of the infections, it becomes obvious that the methods and means having a preventive external action, and also the phytosanitary problems to which phytoiatric science and technique have made contributions, cannot be considered solved in a technically and economically satisfactory manner.

To complete the picture, it should be added that the aforementioned methods and means, the only ones available to the farmer for protecting cultures, do not make it possible to control some of the most serious parasitic forms, which not only damage the crops but also inevitably lead to the destruction of the plants themselves. These diseases, due to their vascular development, are called "systemic diseases" by some authors. The numerous "tracheomycoses" caused by various fungus species, such as Fusarium, Verticellium, Deuterophoma, Graphium must be mentioned in particular.

At this point, it is evident that a substantial improvement in the fungicidal means and methods now used and solution of questions involved in the control of "systemic" diseases can be obtained only if chemical substances penetrating the vegetal organism in various ways are available. These chemical substances either by acting locally or far from the application point must be capable of destroying the already present parasite or of preventing its development in the inner parts of the plant.

The so-called "systemic insecticides" were already used in the pest control, thus demonstrating the possibility of introducing chemical substances in various ways inside the vegetal organism, with the relative displacement and diffusion of the substances in the various organs and tissues of the plant.

While the control of animal parasites (insects, mites, etc.) inside the plants by means of systemic substances is obviously facilitated by the substantial differences existing between the physiological and biochemical processes of the parasites and the host plant, this distinction almost vanishes in case of endotherapeutic fungicides or bactericides.

In fact, it is obvious that the anichlolinesterasic activity to which the lethal action of some systemic insecticidal and miticidal phosphoric esters is essentially to be ascribed, does not interfere with the vital processes of the higher plants and said substances do not exert any phytotoxic activity.

Endotherapic fungicides or bactericides, on the contrary, can easily have a negative effect on the treated plants since the higher vegetal organisms (agrarian plants) must be suspected of a higher physiological and biochemical affinity for the fungicides and bactericides than the organisms belonging to the lowest order of the vegetal kingdom (fungi or bacteria).

An object of this invention is the utilization of β-aminoethylaryl ketones as endophytotherapeutic agents.

Another object of this invention is the endophytotherapy of fungus diseases by means of products that do not have phytotoxic action.

It should be stated in advance that we consider a chemical product as "endotherapeutic" and "immunizing" when the product, without causing appreciable phytotoxic action, is capable of penetrating through the outer protective plant layers (cuticle, epidermis, periderm), diffusing into the inner tissues and of being transferred more or less rapidly from one organ to another of the plant. The product destroys, both at the point of application and at locations removed therefrom, the mycelium of the already installed pathogen (curative action) or the promycelic tube, coming from spores germinated outside, as soon as it is introduced into the host (immunizing action).

The same products have a considerable preventive covering and fumigating activity against the fungus spores before the latter cause infection.

We have found that the β-aminoethylarylketones are products of the highest interest from the aforeconsidered points of view.

The compounds of the aforementioned groups are comprised in the general formula

A—CO—CH$_2$—CH$_2$—Y in which A is an aryl that can be variably substituted, and Y is an amine or an amine salt. The salts (e.g., picrates, ferrocyanides) are practically water insoluble and are particularly useful as surface protectant fungicides because they have a very high immediate effectiveness and a satisfactory resistance to removal by rain.

In Table I are listed the compounds of the aforementioned class which are of particular interest, together with their physico-chemical characteristics, the mark with which they will be indicated hereinbelow, and representative formulas.

The compounds listed in Table I were synthetized according to the Mannish reaction, i.e., by reacting an arylmethylketone (A—CO—CH$_3$, in which A has the aforementioned meaning) with an amine salt and formaldehyde. (Mannich C. Ber., 55 (1922), 356, 3510.)

This method has been improved by other authors (Blicke, F. F., Burkhalter, J. H., J. Am. Chem. Soc., 64 (1942), 453. Fry, E. M., J. Org. Chem., 10 (1945), 259. Maxwell, C. E., Organic Syntheses, 1946, vol. 23, page 30. Winstein, S., J. Org. Chem., 11 (1946), 215).

The corresponding free bases are obtained by known methods, namely by removal of hydrochloric acid with sodium hydroxide from an aqueous solution of the hydrochloride and solvent extraction.

The practically water insoluble salts (e.g. picrates, ferrocyanides) can be obtained by precipitation with the corresponding acids from aqueous solutions of the hydrochloride salts.

Fungicidal compositions having preventive (by contact or fumigation) and/or endophytotherapeutic and immunizing activities, comprise the compounds of Table I and may be used alone or in synergistic mixture with other fungicides.

*Anticryptogamic activity.*—These products were tested in order to determine their anticryptogamic activity against some phytopathis of a considerable economic-agrarian interest, such as downy mildew of grape (*Plasmopara viticola*), apple scab (*Venturia inaequalis*—p.c. *Fusicladium dendriticum*), bean rust (*Uromyces appendiculatus*), carnation rust (*Uromyces dianthi*), olive anthracnose (*Gloeosporium olivarum*), and blue mold (*Peronospora tabacina* Adam).

TABLE I.—$\beta$-AMINOETHYLARYLKETONES OF THE FORMULA A—CO—CH$_2$—CH$_2$—Y

| Mark | Compound | Physical characteristics | Analytical data, percent |
|---|---|---|---|
| S. 80 | $\beta$-dimethylaminoethylphenyl ketone hydrochloride | Crystals, M.P. 155–156° C | N=6.59 (calc. 6.55). Cl=16.69 (calc. 16.69). |
| S. 92 | $\beta$-dimethylaminoethyl-2-hydroxyphenyl ketone hydrochloride | Crystals, M.P. 173–174° C | N=6.11(6.12). Cl=15.62(15.43). |
| S. 113 | $\beta$-isopropylaminoethylphenyl ketone hydrochloride | Crystals, M.P. 175° C | N=6.30(6.15). Cl=63.33(63.29). H=8.02(7.95). |
| S. 114 | $\beta$-piperidinoethylphenyl ketone hydrochloride ($\beta$-piperidylethylphenyl ketone hydrochloride). | Crystals, M.P. 192–193° C | N=5.71(5.52). |
| S. 116 | $\beta$-piperidinoethylphenyl ketone ($\beta$-piperidylethylphenyl ketone) | Oil | N=6.52(6.44). |
| S. 117 | $\beta$-morpholinoethylphenyl ketone hydrochloride | Crystals, M.P. 180–181° C | N=5.71(5.74). |
| S. 123 | $\beta$-piperidinoethyl-4-chlorophenyl ketone ($\beta$-piperidylethyl-4-chlorophenyl | Crystals, M.P. 194–194.5° C | N=5.11(4.86). Cl=24.0(24.6). |
| S. 127 | $\beta$-isopropylaminoethyl-4-chlorophenyl ketone hydrochloride | Crystals, M.P. 167–168° C | N=4.98(5.34). |
| S. 130 | $\beta$-isopropylaminoethyl-3,4-dichlorophenyl ketone hydrochloride | Crystals, M.P. 193–194° C | |
| S. 137 | $\beta$-dimethylaminoethyl-4-chlorophenyl ketone hydrochloride | Crystals, M.P. 171–173° C | N=5.70(5.64). Cl=28.45(28.58). |
| S. 138 | $\beta$-dimethylaminoethyl-3,4-dichlorophenyl ketone hydrochloride | Crystals, M.P. 193–195° C | N=5.02(4.95). Cl=37.58(37.64). |
| S. 139 | $\beta$-morpholinoethyl-4-chlorophenyl ketone hydrochloride | Crystals, M.P. 205–206° C | Cl=24.46(24.78). |
| S. 142 | $\beta$-dimethylaminoethyl-4-methylphenyl ketone hydrochloride | Crystals, M.P. 156–156.5° C | N=6.14(6.15). |
| S. 143 | $\beta$-dimethylaminoethyl-3,4-dichlorophenyl ketone ferrocyanide | Crystals, M.P. 155–158° C | |
| S. 145 | $\beta$-dimethylaminoethyl-3,4-dichlorophenyl ketone oxalate | Crystals, M.P. 163–165° C | N=4.45(4.16). |
| S. 147 | $\beta$-dimethylaminoethyl-2-thienyl ketone hydrochloride | Crystals, M.P. 182–183° C | N=6.65(6.37). S=14.90(14.59). Cl=16.53(16.13). |
| S. 149 | $\beta$-morpholinoethyl-3,4-dichlorophenyl ketone hydrochloride | Crystals, M.P. 180–181° C | N=4.50(4.37). Cl=31.20(33.18). |

TABLE I—Continued

| Mark | Compound | Physical characteristics | Analytical data, percent |
|---|---|---|---|
| S. 161 | β-dimethylaminoethyl-3-nitrophenyl ketone hydrochloride | Crystals, M.P. 197–198° C | N=11.07(10.82). Cl=13.60(13.70). |
| S. 169 | β-dimethylaminoethyl-3-nitro-4-chlorophenyl ketone hydrochloride | Crystals, M.P. 178° C | N=9.75(9.55). Cl=24.10(24.19). C=45.16(45.08). H=4.83(4.81). |
| S. 174 | β-diethylaminoethyl-3,4-dichlorophenyl ketone hydrochloride | Crystals, M.P. 130–132° C | N=4.64(4.51). |
| S. 178 | β-dimethylaminoethyl-3-nitro-4-methylphenyl ketone hydrochloride | Crystals, M.P. 176–177° C | N=10.39(10.27). |
| S. 179 | β-isopropylaminoethyl-3-nitrophenyl ketone hydrochloride | Crystals, M.P. 163–165° C | N=10.22(10.20). |
| S. 180 | β-diethylaminoethyl-3-nitrophenyl ketone | Crystals, M.P. 136–138° C | N=9.90(9.72). |
| S. 181 | β-isopropylaminoethyl-3-nitro-4-chlorophenyl ketone hydrochloride | Crystals, M.P. 176–178° C | N=9.16(9.11). |
| S. 185 | β-diethylaminoethyl-4-chlorophenyl ketone hydrochloride | Crystals, M.P. 137–138° C | N=5.23(5.11). |
| S. 187 | β-isopropylaminoethyl-4-methylphenyl ketone hydrochloride | Crystals, M.P. 171–172° C | N=6.0(5.79). |
| S. 192 | β-dimethylaminoethyl-2,4-dichlorophenyl ketone hydrochloride | Crystals, M.P. 138–139° C | N=5.08(4.96). |
| S. 196 | β-isopropylaminoethyl-3-nitro-4-methylphenyl ketone hydrochloride | Crystals, M.P. 171–172° C | N=9.92(9.80). |
| S. 201 | β-dimethylaminoethyl-2-(tetrahydronaphthyl) ketone hydrochloride 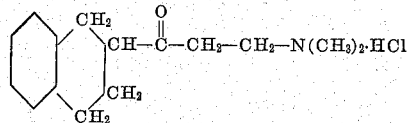 | Crystals, M.P. 160–161° C | N=5.49(5.23). |
| S. 202 | β-propylaminoethyl-4-chlorophenyl ketone hydrochloride | Crystals, M.P. 140–142° C | N=4.87(4.60). Cl=11.60(11.65). |
| S. 205 | β-dimethylaminoethyl-4-bromo-1-naphthyl ketone hydrochloride 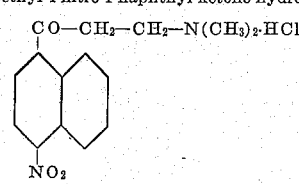 | Crystals, M.P. 176–177° C | N=4.25(4.09). Cl=10.30(10.34). Br=23.44(23.32). |
| S. 209 | β-dimethylaminoethyl-3-bromophenyl ketone hydrochloride | Crystals, M.P. 205–206° C | N=5.10(4.78). Cl=11.98(12.11). |
| S. 210 | β-dimethylaminoethyl-1-naphthyl ketone hydrochloride | Crystals, M.P. 154–155° C | N=5.58(5.31). Cl=13.52(13.44). |
| S. 211 | β-dimethylaminoethyl-2-naphthyl ketone hydrochloride | Crystals, M.P. 170–171° C | N=5.39(5.33). Cl=13.57(13.44). |
| S. 212 | β-dimethylaminoethyl-4-chloro-1-naphthyl ketone hydrochloride | Crystals, M.P. 154–155° C | N=4.88(4.69). Cl=23.53(23.78). |
| S. 213 | β-dimethylaminoethyl-4-methoxyphenyl ketone hydrochloride | Crystals, M.P. 183–184° C | N=6.1(5.74). Cl=13.98(14.54). |
| S. 214 | β-dimethylaminoethyl-4-nitro-1-naphthyl ketone hydrochloride CO—CH₂—CH₂—N(CH₃)₂·HCl (naphthyl with NO₂) | Crystals, M.P. 200–202° C | N=8.79(9.07). Cl=11.1(11.48). |
| S. 215 | β-dipropylaminoethyl-1-naphthyl ketone hydrochloride | Crystals, M.P. 127–128° C | N=4.42(4.38). Cl=11.13(11.08). |
| S. 216 | β-isopropylaminoethyl-1-naphthyl ketone hydrochloride | Crystals, M.P. 156–158° C | N=5.36(5.04). Cl=12.58(12.61). |
| S. 217 | β-dibutylaminoethyl-1-naphthyl ketone hydrochloride | Crystals, M.P. 100–101° C | N=4.42(4.38). |
| S. 218 | β-diethylaminoethyl-1-naphthyl ketone hydrochloride | Crystals, M.P. 134–135° C | N=5.2(4.80). Cl=12.36(12.15). |
| S. 219 | β-morpholinoethyl-1-naphthyl ketone hydrochloride | Crystals, M.P. 171–172° C | N=4.76(4.58). Cl=11.86(11.59). |
| S. 220 | β-piperidine-ethyl-1-naphthyl ketone hydrochloride (β-piperidylethyl-1-naphthyl ketone hydrochloride). | Crystals, M.P. 176–177° C | N=4.94(4.61). Cl=11.62(11.67). |
| S. 232 | β-piperidinoethyl-2-hydroxyphenyl ketone hydrochloride (β-piperidyl-ethyl-2-hydroxyphenyl ketone hydrochloride). | Crystals, M.P. 170–171° C | N=5.51(5.19). |

TABLE I—Continued

| Mark | Compound | Physical characteristics | Analytical data, percent |
|---|---|---|---|
| S. 233 | β-diethylaminoethyl-4-chloro-1-naphthyl ketone hydrochloride | Crystals, M.P. 126–127° C | N=4.60(4.29). Cl=21.57(21.73). |
| S. 234 | β-dipropylaminoethyl-4-chloro-1-naphthyl ketone hydrochloride | Crystals, M.P. 111–113° C | N=4.28(3.95). Cl=19.76(20.01). |
| S. 236 | β-morpholinoethyl-4-chloro-1-naphthyl ketone hydrochloride | Crystals, M.P. 176–176.5° C | N=4.37(4.11). Cl=20.50(28.84). |
| S. 237 | β-piperidinoethyl-4-chloro-1-naphthyl ketone hydrochloride (β-piperidylethyl-4-chloro-1-naphthyl ketone hydrochloride). | Crystals, M.P. 176–177° C | N=4.48(4.31). Cl=21.05(20.96). |
| S. 239 | β-morpholinoethyl-2,4-dichlorophenyl ketone hydrochloride | Crystals, M.P. 196–197° C | N=4.48(4.31). Cl=32.57(32.77). |
| S. 240 | β-piperidinoethyl-2,4-dichlorophenyl ketone hydrochloride (β-piperidylethyl-2,4-dichlorophenyl ketone hydrochloride). | Crystals, M.P. 163–164° C | N=4.66(4.37). |
| S. 251 | β-diethylaminoethyl-2,4-dichlorophenyl ketone hydrochloride | Crystals, M.P. 149–150° C | N=4.83(4.48). |
| S. 252 | β-piperidinoethyl-3-nitrophenyl ketone hydrochloride (β-piperidylethyl-3-nitrophenyl ketone hydrochloride). | Crystals, M.P. 173–175° C | N=8.95(9.37). |
| S. 253 | β-morpholinoethyl-3-nitrophenyl ketone hydrochloride | Crystals, M.P. 185–186° C | N=9.57(9.31). |
| S. 255 | β-morpholinoethyl-4-methylphenyl ketone hydrochloride | Crystals, M.P. 205° C | N=5.41(5.19). |
| S. 256 | β-piperidinoethyl-4-methylphenyl ketone hydrochloride (β-piperidylethyl-4-methylphenyl ketone hydrochloride). | Crystals, M.P. 173–174° C | N=5.40(5.23). |
| S. 259 | β-dimethylaminoethyl-1-naphthyl ketone oxalate | Crystals, M.P. 137–140° C | |
| S. 261 | β-piperidinoethyl-3,4-dichlorophenyl ketone hydrochloride (β-piperidylethyl-3,4-dichlorophenyl ketone hydrochloride). | Crystals, M.P. 175–176° C | Cl=32.90(32.97). |
| S. 262 | β-morpholinoethyl-3-nitro-4-chlorophenyl ketone hydrochloride | Crtystals, M.P. 168–169° C | Cl=21.03(21.15). |
| S. 263 | β-piperidinoethyl-3-nitro-4-chlorophenyl ketone hydrochloride (β-piperidylethyl-3-nitro-4-chlorophenyl ketone hydrochloride). | Crystals, M.P. 179–180° C | Cl=20.95(21.28). |
| S. 272 | β-dimethylaminoethyl-1-naphthyl ketone | Oil | |
| S. 279 | β-piperidinoethyl-4-chloro-1-naphthyl ketone (β-piperidylethyl-4-chloro-1-naphthyl ketone). | Oil | |
| S. 280 | β-dimethylaminoethyl-9-anthranyl ketone hydrochloride<br><br>[structure: anthracene with 9-position substituent —C(=O)—CH$_2$—CH$_2$N(CH$_3$)$_2$·HCl] | Crystals, M.P. 163–164° C | N=4.65 (4.46). |
| S. 291 | β-dimethylaminoethyl-3-nitro-4-chlorophenyl ketone hydrobromide | Crystals, M.P. 183–184° C | N=8.23(8.29). Br=23.35(23.67). |
| S. 300 | β-morpholinoethyl-2-hydroxyphenyl ketone hydrochloride | Crystals, M.P. 194–195° C | N=5.27(5.15). |
| S. 366 | β-piperidinoethyl-2-hydroxyphenyl ketone (β-piperidylethyl-2-hydroxyphenyl ketone). | Oil | |
| S. 367 | β-dimethylaminoethyl-4-chloro-1-naphthyl ketone | Oil | |
| S. 368 | β-dimethylaminoethyl-2-hydroxyphenyl ketone | Oil | |
| S. 369 | β-morpholinoethyl-4-nitrophenyl ketone hydrochloride | Crystals, M.P. 192–194° C | N=9.53(9.31). Cl=12.52(11.79). |
| S. 381 | β-morpholinoethyl-2-nitrophenyl ketone hydrochloride | Crystals, M.P. 276–280° C | N=9.47(9.31). Cl=12.26(11.79). |
| S. 382 | β-dimethylaminoethyl-2-nitrophenyl ketone hydrochloride | Crystals, M.P. 263–265° C | N=11.06(10.82). Cl=13.99(13.70). |
| S. 383 | β-morpholinoethyl-4-bromo-1-naphthyl ketone hydrochloride | Crystals, M.P. 172–174° C | N=4.12(3.64). |
| S. 385 | β-morpholinoethyl-2-chlorophenyl ketone hydrochloride | Crystals, M.P. 165° C | N=4.98(4.82). Cl=24.04(24.43). |
| S. 386 | β-dimethylaminoethyl-2-chlorophenyl ketone hydrochloride | Crystals, M.P. 164–164.5° C | N=6.40(5.64). Cl=28.08(28.58). |
| S. 387 | β-morpholinoethyl-4-fluoro-1-naphthyl ketone hydrochloride | Crystals, M.P. 188–189° C | N=4.51(4.32). Cl=10.97(10.95). |
| S. 388 | β-morpholinoethyl-4-chloro-1-naphthyl ketone sulfate | Crystals, M.P. 160–161° C | Cl=8.64(8.82). H$_2$SO$_4$=7.47(7.98). |
| S. 389 | β-dimethylaminoethyl-4-fluoro-1-naphthyl ketone hydrochloride | Crystals, M.P. 173–174° C | N=5.42(4.97). Cl=12.59(12.58). |
| S. 390 | β-morpholinoethyl-4-methyl-1-naphthyl ketone hydrochloride | Crystals, M.P. 176–177°° C | N=4.47(4.38). Cl=11.33(11.08). |
| S. 414 | β-morpholinoethyl-9-anthranyl ketone hydrochloride | Crystals, M.P. 165–166° C | N=3.97(3.93). Cl=9.80(9.96). |

TABLE I—Continued

| Mark | Compound | Physical characteristics | Analytical data, percent |
|---|---|---|---|
| S. 558 | β-dimethylaminoethyl-9-anthranyl ketone picrate | Crystals | |
| S. 559 | β-dimethylaminoethyl-1-naphthyl ketone picrate | Crystals | |
| S. 560 | β-morpholinoethyl-4-chloro-1-naphthyl ketone picrate | Crystals | |
| S. 564 | β-dimethylaminoethyl-4-chloro-1-naphthyl ketone picrate | Crystals | |
| S. 565 | β-dipropylaminoethyl-1-naphthyl ketone picrate | Crystals | |
| S. 575 | β-morpholinoethyl-4-chloro-1-naphthyl ketone ferrocyanide | Crystals | |
| S. 576 | β-morpholinoethyl-1-naphthyl ketone picrate | Crystals | |

Zineb, which is used for comparison as a presently available fungicide, is zinc ethylenebis (dithiocarbamic acid).

(1) ENDOTHERAPEUTIC AND IMMUNIZING ACTIVITY

Vine peronospora (Plasmopara viticola)

The field tests, which were carried out in order to confirm the preliminary results obtained on vines grown in a conditioned room, utilized the following method. In an open field, the lower face of vine leaves is sprayed with a conidia suspension in sterile water, having a density of about 500,000 conidia per milliliter. After infection, the leaves are closed in polyethylene bags previously wetted on the inside, in order to have a moisture-saturated atmosphere. About 16 hours after the infection, the bags are removed and at given intervals of time from the infection the leaves are subjected to spraying of both their upper and lower faces with an aqueous solution of the products under consideration.

After a period of time which varies from 4 to 10 days after the infection and depends on the temperature and moisture conditions, the leaves are cut and incubated in a room conditioned at 20° C. and saturated with moisture until the appearance of the fungus. The results of a first test are reported in Table II.

TABLE II

[Endotherapeutical activity of 3-β-aminoarylketones on Plasmopara viticola. Treatment with a 5% dosage. Results determined on 10 leaves per thesis]

| Products: | Fungus growth (see below) |
|---|---|
| S. 210 | 0 |
| S. 212 | 0 |
| S. 236 | 0 |
| Zineb | 4.5 |
| Control | 4.3 |

0=no growth
3=growth on one-half of the leaf surface
4=growth on two-thirds of the leaf surface
5=growth on the whole leaf surface The influence of time elapsing between the infection and the treatment on the endotherapeutical activity of the product was then studied. As a severe control, a particularly high inoculum density (800,000 conidia per cc.) was purposely used so that, in the case of treatment effected 7 days after the infection, the inner development of the fungus mycelium was so considerable as to cause expanded necroses on wide areas of the leaf. The results were positive, as shown in Table III.

TABLE III

[Influence of time between infection and treatment on the endotherapeutic activity of 3-β-aminoethylaryl ketone hydrochlorides. Treatment with 5% dosage. Infection in open field on vine leaves with Plasmopara viticola]

| Product | Fungus growth (see below) | |
|---|---|---|
| | Interval of time between infection and treatment: 3 days (average of 6 repetitions per each thesis) | Interval of time between infection and treatment: 7 days (average of 10 repetitions per each thesis) |
| S. 210 | 0 | 1.5 |
| S. 212 | 0.33 | 1.6 |
| S. 236 | 0.16 | 0.2 |
| Zineb | 4.1 | 3.3 |
| Control | 4.5 | 4.5 |

0=no growth.
1=sporadic growth spots on the leaf lamina.
2=growth on ⅓ of the leaf surface.
3=growth on ½ of the leaf surface.
4=growth on ⅔ of the leaf surface.
5=growth on the whole leaf surface.

Moreover, the results of the field tests confirmed the results obtained in the laboratory in the screening stage. These results have shown that the antiperonospora activity of β-aminoethylnaphthyl ketone hydrochlorides is markedly higher than that of β-aminoethylphenyl ketone hydrochlorides. As a substance representative of the first class was chosen β-dimethylaminoethyl-1-naphthyl ketone (S. 210) and for the other class β-dimethylaminoethyl-2-hydroxyphenyl ketone hydrochloride (S. 92), and β-morpholinoethyl-2-hydroxyphenyl ketone hydrochloride (S. 300). A 2% dosage of S. 210 resulted in a complete curative action within 3 days after infection with Plasmopara viticola. Neither S. 300 or S. 92 showed any curative action under the same conditions of infection and treatment and after the same lapse of time.

A field trial was carried out with one of the more active products (S. 236) to determine the relationship between the dosage and the endotherapeutic action. The infection was effected by spraying the underside of the leaves with a natural inoculum; the treatment with the various doses was carried out after 3 days. The results are reported in Table IV.

TABLE IV

[Open field endotherapeutic activity of S. 236, applied in various doses on *Plasmopara viticola*; a natural inoculum was used for carrying out the infection. Results determined on 5 leaves for each thesis]

| Product | Pathogen growth (see below) | | | |
|---|---|---|---|---|
| | 5% | 3% | 1% | 0 |
| S. 236 | 0 | 0.2 | 2.8 | 3.6 |

0=no growth.
1=growth traces.
2=sporadic traces of growth on the leaf face.
3=growth on 1/3 of the leaf surface.
5=growth on 2/3 of the leaf surface.

*Apple scab* (Venturia inaequalis—f.c. Fusicladium dendriticum)

Two-year-old apple trees, grown in an open field, are inoculated with a suspension of *Fusicladium dendriticum* conidia (200,000 per cc.) and are then closed in a polyethylene bag so as to preserve the drops of conidium suspension. After an interval of 24 hours the bags are removed and, two days after the inoculation, the trees are treated with the test products in aqueous solution.

The results were taken 1 month after the beginning of the test. These results, reported in Table V, were determined on samples of 150 leaves per each thesis (each consisting of two plants).

TABLE V

Open-field endotherapeutic activity of some products of the series of β-aminoethylaryl ketones on apple trees previously infected with conidia of *Fusicladium dendriticum* (pathogen of apple scab)]

| Product | Concentration, percent | Percentage of damaged leaf surface in comparison with the control considered as 100 |
|---|---|---|
| S. 280 | 3 | 5.7 |
| S. 414 | 3 | 4.4 |
| S. 218 | 3 | 3.0 |
| S. 215 | 3 | 3.6 |
| S. 233 | 3 | 3.6 |
| S. 237 | 3 | 9.0 |
| S. 217 | 3 | 26.6 |
| Zineb | 2 | 110.0 |

*French bean rust* (Uromyces appendicolatus)

French bean leaves, cut at the base of the stem, are incubated in Petri dishes having a diameter of 20 cc., containing 2 filter paper discs (separated by 6 glass rings). The leaf, with its upper face upward, is placed on the upper disc. The upper disc is provided with a central hole. A drop of a test product solution of known volume and concentration is placed on the leaf by means of a microsyringe in correspondence with the hole in the upper disc. After deposition of the drops, the dishes are kept open to allow a perfect drying of the deposit. The dishes are then kept closed for 15 hours, to allow the penetration and diffusion of the product. The dishes are then opened, and the leaves are upset with the lower face upward, so that the application point of the drop corresponds to the center of the hole in the disc. Thereupon the leaves are infected by spraying on their underside a suspension of *U. appendiculatus* spores in sterile water, with a density of about 150,000 spores per cc. After infection, the dishes are opened and the contents incubated in a room conditioned at 20° C. for a period of 7 to 10 days to permit the complete growth of the fungus. The activity of the product is evaluated on the basis of the size of the zone of inhibition of the fungus growth, in correspondence with the point of application of the drop. The results obtained by the said technique are reported in Table VI.

TABLE VI

Immunizing activity of a series of β-aminoethylaryl ketones applied as drops onto French bean leaves infected with *Uromyces appendiculatus*]

| Product | Activity (inhibition halo in cm.) | Product | Activity (inhibition halo in cm.) |
|---|---|---|---|
| S. 210 | 5-6 | S. 127 | 1-1.5 |
| S. 92 | 4 | S. 130 | 1-1.5 |
| S. 192 | 4 | S. 142 | 1-1.5 |
| S. 218 | 4 | S. 147 | 1-1.5 |
| S. 219 | 4 | S. 169 | 1-1.5 |
| S. 240 | 4 | S. 174 | 1-1.5 |
| S. 272 | 4 | S. 178 | 1-1.5 |
| S. 300 | 4 | S. 179 | 1-1.5 |
| S. 368 | 4 | S. 180 | 1-1.5 |
| S. 386 | 4 | S. 181 | 1-1.5 |
| S. 389 | 4 | S. 185 | 1-1.5 |
| S. 80 | 2-3 | S. 187 | 1-1.5 |
| S. 123 | 2-3 | S. 196 | 1-1.5 |
| S. 137 | 2-3 | S. 202 | 1-1.5 |
| S. 138 | 2-3 | S. 205 | 1-1.5 |
| S. 139 | 2-3 | S. 211 | 1-1.5 |
| S. 143 | 2-3 | S. 212 | 1-1.5 |
| S. 145 | 2-3 | S. 214 | 1-1.5 |
| S. 149 | 2-3 | S. 215 | 1-1.5 |
| S. 201 | 2-3 | S. 216 | 1-1.5 |
| S. 209 | 2-3 | S. 217 | 1-1.5 |
| S. 213 | 2-3 | S. 234 | 1-1.5 |
| S. 220 | 2-3 | S. 236 | 1-1.5 |
| S. 232 | 2-3 | S. 239 | 1-1.5 |
| S. 233 | 2-3 | S. 251 | 1-1.5 |
| S. 237 | 2-3 | S. 252 | 1-1.5 |
| S. 255 | 2-3 | S. 253 | 1-1.5 |
| S. 256 | 2-3 | S. 259 | 1-1.5 |
| S. 261 | 2-3 | S. 262 | 1-1.5 |
| S. 291 | 2-3 | S. 263 | 1-1.5 |
| S. 366 | 2-3 | S. 279 | 1-1.5 |
| S. 387 | 2-3 | S. 367 | 1-1.5 |
| S. 390 | 2-3 | S. 369 | 1-1.5 |
| S. 113 | 1-1.5 | S. 381 | 1.1.5 |
| S. 114 | 1-1.5 | S. 383 | 1-1.5 |
| S. 116 | 1-1.5 | S. 385 | 1-1.5 |
| S. 117 | 1-1.5 | S. 388 | 1-1.5 |

Tests were also carried out in order to evaluate the systemic immunizing activity on French bean plants infected with *U. appendiculatus*. In stem application tests, 6-cm. high French bean plants, growth in a pot in a conditioned room, are treated by spreading a paste formulation containing 3% (Table VII) and 5% (Table VIII) of active ingredient onto the stem zone comprised between the base and the insertion point of the cotyledons. The comparative evaluation of the migration of the products is carried out by taking and infecting with *U. appendiculatus* all leaves at various intervals from the treatment. The results are determined by counting the uredospores in each leaf. In Tables VII and VIII are summarized the results obtained by operating with some β-aminoethylaryl ketones on French bean plants.

TABLE VII

[Immunizing activity results of some products of the series of β-amino ethylaryl ketones on French bean plants infected with *Uromyces appendiculatus*, on whose stem formulations containing 3% of active ingredient have previously been applied]

| Interval of time between the treatment and the infection, days | Tested leaves | Disease percentage referred to the control | | |
|---|---|---|---|---|
| | | S. 92 | S. 210 | S. 300 |
| 4 | Primary | 32.5 | 29.0 | 51.0 |
| | Secondary | 21.5 | 2.0 | 9.5 |
| | Tertiary | 0.0 | 0.0 | 2.0 |
| 6 | Primary | 12.9 | 0.0 | 0.0 |
| | Secondary | 0.0 | 0.0 | 0.0 |
| | Tertiary | 0.0 | 0.0 | 0.0 |

(The control was 100.)

TABLE VIII

[Immunizing activity results of S.210 and S.272 on French bean plants, infected with *Uromyces appendiculatus*, on whose stem formulations containing 5% of active ingredient have previously been applied. Interval of time between the treatment and the infection 7 days]

| Product | Disease percentage referred to the control | | |
|---|---|---|---|
| | Primary leaves | Secondary leaves | Tertiary leaves |
| S. 210 | 6.5 | 3.2 | 1.4 |
| S. 272 | 8.3 | 3.4 | 0.3 |
| Control | 100.0 | 100.0 | 100.0 |

Analogous results were obtained in field tests. Under these conditions the products are brushed over an area of 30 cm. on the base portion of the stem of 1.70 m.-high French bean plants. Four days after the treatment (carried out with a paste composition containing 10% of active ingredient), the plants—3 repetitions per test—are infected with an aqueous suspension of *U. appendiculatus* uredospores (180,000 per cc.). The plants are then covered by a polyethylene bag for 16 hours, in order to favor the growth of the pathogen. The results are determined by counting the uredospores developed on each leaf. The results obtained are reported in Table IX.

TABLE IX

[Immunizing activity obtained in field tests against *Uromyces appendiculatus* on French bean plants spread on the stem with 2 β-aminoethylarylketone hydrochlorides]

| Product | Disease percentage referred to the control |
|---|---|
| S. 210 | 0 |
| S. 300 | 0.4 |
| Control | 100.0 |

Tests for evaluating the systemic activity by root absorption are carried out by immersing the roots of 15-day-old French bean plants, carefully washed with distilled water, in glass vessels containing 200 cc. of an aqueous solution of the products to be tested. After 44 hours of immersion the roots are carefully washed and the solution is replaced by distilled water. The evaluation of the absorption, migration and activity is carried out by removing the leaves at various intervals of time after treatment and placing them in a wet chamber where they are infected with *U. appendiculatus* by the usual process, then determining the disease index in respect to the control. The results are reported in Table X.

TABLE X

[Immunizing activity against *Uromyces appendiculatus* of 2 β-aminoethylphenyl ketone hydrochlorides applied by root absorption (solution of 200 p.p.m.) to French bean plants grown in a conditioned room]

| Product | Disease percentage referred to the control (6 leaves per thesis) |
|---|---|
| S. 92 | 0.2 |
| S. 192 | 0.3 |
| Control | 100.0 |

Root absorption tests were also carried out in open field on 1.7-m. high French bean plants (cv. Borlotto) in groups of 3 plants. The treatment is carried out by spraying the soil in a circular zone of 20–30 cm. around the stems of each group of 3 plants with an aqueous solution containing 3% of active product. Three treatments are effected, at one day intervals, by administering 5 liters of liquid per plant group and per treatment. Two days after the last application, the lower face of cut leaves were sprayed with *U. appendiculatus* uredospores (200,000 per cc.). The leaves are then incubated in Petri dishes at 20° C. until the uredospores are formed. The results are determined by counting the uredospores formed in each leaf. These results are reported in Table XI.

TABLE XI

[Immunizing activity results obtained with S. 210 on *Uromyces appendiculatus*, by applying the product through root absorption onto French bean plants in open field]

| Experimental thesis | Uredospores number per leaf (average of 35 repetitions) | Disease percent referred to the control=100 |
|---|---|---|
| Treated plants | 3 | 0.85 |
| Control plants | 352 | 100 |

Carnation rust (Uromyces dianthi)

20-cm. high carnation plants, grown in a conditioned room and artificially infected with a suspension of *Uromyces dianthi* spores (density 200,000 spores per cc.). The inoculated plants are kept for 48 hours in a moisture-saturated room at 20° C. and are then subjected to the treatment with the products in a 1% aqueous solution. The plants are then incubated at 20–25° C. with 50 to 70% of relative humidity till the fungus growth. The determination of the results (18 days after the infection) is carried out by counting the uredospores formed on each leaf. These results are reported in Table XII.

TABLE XII

[Endotherapeutic activity of a series of products belonging to the class of β-animoethylaryl ketones against *Uromyces dianthi*]

| Plant | Product | Number of repetitions per test | Average pustule number per plant | Disease percent referred to the control =100 |
|---|---|---|---|---|
| Alba | S. 210 | 4 | 5.7 | 8.5 |
| | S. 236 | | 12.0 | 18.0 |
| | S. 300 | | 21.7 | 32.6 |
| | S. 92 | | 30.0 | 45.1 |
| | S. 192 | | 8.7 | 13.0 |
| Bianco Venere | S. 210 | 3 | 0.3 | 14.2 |
| | S. 218 | | 24.0 | 36.7 |
| | S. 219 | | 22.6 | 34.6 |
| | S. 220 | | 21.3 | 32.6 |
| | S. 236 | | 24.6 | 37.6 |

Olive anthracnose (Gloeosporium olivarum)

To determine the immunizing activity of the products to be tested in respect of *Gloeosporium olivarum*, the following procedure was adopted. Olives (cv. Leccino) are sprayed at low volume with a microsprayer operating at air pressure of 1.6 atm. By spraying for 30 seconds, a solution of the test fungicide with a concentration of 5% in distilled water, each drupe is covered with a deposit of 30γ of active substance. The olives thus treated are kept at room temperature for 4 days. Thereafter the drupes are washed with distilled water 3–4 times (in this way it has been ascertained experimentally that all the residue of the active substance present on the drupe surface is removed) and the pathogen is then inoculated as follows:

(1) Suspensions in sterile distilled water are prepared with *G. olivarum* conidia obtained from a 4-day culture developed on potato dextrose agar Dipco at 21° C.; the density of the suspension is brought to a value of 700,000 conidia/cc.;

(2) Each drupe is wounded in 5 points (in the apex and in other diametrically opposed four points on the drupe surface) by passing the olive on a very fine abrasive paper so as to cause a lesion involving a circular zone having a diameter of about 2 mm. and a depth of a millimeter fraction;

(3) On each lesion made as described above (2), a fine drop of conidia suspension prepared as above (1) is deposited.

After inoculation, the olives are incubated for 2 days in a wet room at 26° C. and then for 4–5 days at 21° C.

in absence of humidity and in the dark. The disease percentages, referred to the controls, obtained on drupes treated with the products to be tested and referred to the controls (no fungicide treatment) are reported in Table XIII.

TABLE XIII

[Immunizing activity of some products on pick-up olives inoculated with *Gloeosporium olivarum*, 4 days after the treatment]

| Product | Concentration | Disease percentage referred to the control =100 |
|---|---|---|
| S. 300 | 5.0 | 0.0 |
| S. 300 | 2.5 | 3.8 |
| S. 192 | 5.0 | 0.0 |
| S. 192 | 2.5 | 0.0 |
| S. 232 | 5.0 | 15.0 |
| S. 232 | 2.5 | 28.7 |
| Zineb | 5.0 | 105.0 |
| Zineb | 2.5 | 105.0 |

(2) PREVENTIVE SPORICIDAL ACTIVITY BY CONTACT OR FUMIGATION

Down mildew of grape (Plasmopara viticola)

Tests for determining the preventive sporicidal activity by contact were carried out on vine plants grown in a conditioned room by operating as follows. The products, in aqueous suspension or solution, are sprayed on the lower face of the leaves of homogeneous groups of plants. 24 hours after the treatment, the plants are infected by spraying onto the lower face of the leaves a suspension of *Plasmopara viticola* conidia (400,000 per cc.) and then incubated for 24 hours at 20° C. in a room saturated with humidity. The plants are transferred to a room at 20–25° C. Two days later the group of test plants is transferred into a room saturated with humidity until the fungus is completely grown. The results are taken by determining on each leaf the percentage of surface injured by the pathogen. In Tables XIV, XV, XVI and XVII are reported the results obtained in successive tests.

TABLE XIV

[Preventive sporicidal activity by contact of some β-aminoethylaryl ketones against *P. viticola* (3 repetitions for each test)]

| Product | Percentage of leaf surface injured by the pathogen referred to the control=100 | | |
|---|---|---|---|
| | 111 p.p.m. | 36 p.p.m. | 12 p.p.m. |
| S. 169 | 0 | 0 | 1.8 |
| S. 205 | 0 | 0.4 | 5.6 |
| S. 215 | 0 | 0.5 | 7.8 |

TABLE XV

[Preventive sporicidal activity by contact of S. 300 and Zineb against *P. viticola* (3 repetitions per test)]

| Product | Percentage of leaf surface injured by the pathogen referred to the control=100 | | | |
|---|---|---|---|---|
| | 333 p.p.m. | 111 p.p.m. | 36 p.p.m. | 12 p.p.m. |
| S. 300 | 0 | 4.4 | 9.3 | 23.2 |
| Zineb | 0 | 1.1 | 28.2 | 44.6 |

TABLE XVI

[Preventive sporicidal activity by contact of S. 236, S. 205 and Zineb against *P. viticola* (3 repetitions per test)]

| Product | Percentage of leaf surface injured by the pathogen referred to the control=100 | | |
|---|---|---|---|
| | 20 p.p.m. | 10 p.p.m. | 5 p.p.m. |
| S. 205 | 3.29 | 17.58 | 62.35 |
| S. 236 | 0.00 | 7.02 | 10.67 |
| Zineb | 22.40 | 43.70 | 52.10 |

TABLE XVII

[Preventive sporicidal activity of S. 558, S. 560, S. 564, S. 565 and Zineb against *P. viticola* (3 repetitions per test)]

| Product | Concentrations of active principle, p.p.m. | Percentage of the surface of the leaf covered with the mold |
|---|---|---|
| S. 558 | 100 | 0 |
| | 80 | 0 |
| | 60 | 0 |
| | 40 | 0.1 |
| | 20 | 3.7 |
| | 10 | 99.2 |
| S. 560 | 100 | 0 |
| | 80 | 0 |
| | 60 | 0 |
| | 40 | 0.46 |
| | 20 | 62.80 |
| | 10 | 78.00 |
| S. 564 | 100 | 0 |
| | 80 | 0 |
| | 60 | 0.2 |
| | 40 | 0.4 |
| | 20 | 1.5 |
| | 10 | 20.0 |
| S. 565 | 100 | 0 |
| | 80 | 0 |
| | 60 | 0.1 |
| | 40 | 10.2 |
| | 20 | 16.1 |
| Zineb | 100 | 0 |
| | 80 | 0.2 |
| | 60 | 1.2 |
| | 40 | 36.1 |
| | 20 | 98.9 |

The preventive sporicidal activity by fumigation against the same pathogen was determined by the following method. Two superposed filter paper discs having a diameter of 23.5 cm. and provided with a central hole with a diameter of 8 cm. are placed on a perfectly flat glass sheet and then impregnated with an aqueous suspension or solution of the product to be tested. Immediately thereafter, in correspondence with the central hole, is placed a pot containing a 25-cm. high vine plant whose leaves have previously been infected with *Plasmopara viticola* (the infection technique is the same as described above). The two operations (treatment of the paper discs and inoculation) are carried out by two persons operating simultaneously so as to allow the almost immediate covering of the inoculated plant and of the two underlying discs with a glass cup having a diameter of 28.5 cm. and a height of 44 cm. The plants protected by the cups are incubated at 20° C. for 24 hours, then uncovered and transferred at 20–25° C. for further 2–3 days and finally kept at 20° C. in a room saturated with humidity till the pathogen is grown.

The determination of the results is carried out by evaluation of the leaf surface covered by the fungus. In Table XVIII are reported the values determined by the said method.

TABLE XVIII

[Preventive sporicidal activity by fumigation exerted "in vivo" by some β-aminoethylaryl ketones against *P. viticola* (1.9 mg. of active substance applied per 1000 cc. of room volume), one vine plant per each test]

| Product | Percentage of leaf surface injured by the pathogen, referred to the controls= 100 (average of 2 tests) |
|---|---|
| S. 192 | 0 |
| S. 210 | 3 |
| S. 212 | 6 |
| S. 236 | 0 |
| S. 300 | 0 |

After the test, phytotoxic effects were observed only in the case of S. 300.

Apple scab (Fusicladium dendriticum)

The preventive sporicidal activity by contact was determined on 2-year-old apple trees (cv. Red Delicious)

grown in open field, by a test carried out as follows. The treatment is effected by spraying the test product in aqueous solution or suspension. After 1 and 4 days respectively, the infection is effected with a suspension of conidia (400,000 per cc.) taken from naturally infected leaves of the cultivated variety Rosa Mantovana, and the plants are then covered with a polyethylene bag for 24 hours. Thirty days after the inoculation the percentage of the leaf surface injured by the disease is evaluated.

The results obtained in this test are summarized in Table XIX.

TABLE XIX

[Preventive sporicidal activity by contact of S. 280 and Zineb against *Fusicladium pirinum* as a function of the use doses and the interval of time elapsing between the treatment and the infection (two plants for each test)]

| Product | Interval of time between treatment and infection, days | Percentage of leaf surface injured by the pathogen, referred to the controls=100 | | |
|---|---|---|---|---|
| | | 5%. | 3%. | 2%. |
| 2. 280 | 1 | 7.6 | 13.5 | |
| Zineb | 1 | | | 2.5 |
| S. 280 | 4 | 18.0 | 20.2 | |
| Zineb | 4 | | | 9.4 |

*Bean rust* (Uromyces appendiculatus)

The evaluation of the sporicidal activity by contact was carried out by adopting the following technique. The treatment is effected on 14–15-day-old plants grown in a pot in a conditioned room. The test products are sprayed in aqueous solutions with various concentrations onto both faces of the primary leaves. After 24 hours, the plants are inoculated with a suspension of uredospores (180,000 spores per cc.) and incubated for 48 hours in a room saturated with moisture at 20° C.; the plants are then transferred into a room at 20–25° C. with a relative humidity of 50–70% until the pathogen is grown.

The results were taken by counting the number of blisters developed on each leaf. The values determined in two tests are reported in Tables XX and XXI.

TABLE XX

[Preventive sporicidal activity by contact exerted by S. 236 against *Uromyces appendiculatus* (3 plants for each test)]

| Product | Disease index referred to the controls=100 | | | |
|---|---|---|---|---|
| | 100 p.p.m. | 50 p.p.m. | 25 p.p.m. | 12.5 p.p.m. |
| S. 236 | 0 | 0 | 0.31 | 7.64 |

TABLE XXI

[Preventive sporicidal activity by contact exerted by S. 210 and S. 300 against *Uromyces appendiculatus*]

| Product | Disease index referred to the controls=100 (plants per test) | | | |
|---|---|---|---|---|
| | 100 p.p.m. | 50 p.p.m. | 25 p.p.m. | 12.5 p.p.m. |
| S. 210 | 0 | 0.1 | 0.70 | 6.60 |
| S. 300 | 1.87 | 3.87 | 18.25 | 42.19 |

By using a technique similar to that already described for the "in vivo" test with the *Plasmopara viticola*, the preventive sporicidal activity by fumigation was evaluated also on French bean plants infected with *Uromyces appendiculatus*.

In Table XXII are reported the values obtained with various β-aminoethylaryl ketones.

TABLE XXII

[Preventive sporicidal activity by fumigation exerted in vivo by a series of β-aminoethylaryl ketones against *U. appendiculatus* (2.9 mg. of active substance applied per 1000 cc. of room volume) (one plant per test)]

| Product | Disease index referred to the controls=100 |
|---|---|
| S. 123 | 0.1 |
| S. 137 | 0 |
| S. 138 | 30 |
| S. 142 | 0 |
| S. 149 | 0 |
| S. 161 | 0.2 |
| S. 174 | 0 |
| S. 180 | 8 |
| S. 185 | 0 |
| S. 192 | 0 |
| S. 202 | 0 |
| S. 205 | 0 |
| S. 210 | 0 |
| S. 212 | 0 |
| S. 215 | 0 |
| S. 218 | 0 |
| S. 220 | 0 |
| S. 232 | 0 |
| S. 233 | 0 |
| S. 236 | 0 |
| S. 237 | 0.1 |
| S. 239 | 0 |
| S. 252 | 2.1 |
| S. 253 | 0.3 |
| S. 280 | 0.1 |
| S. 300 | 0 |
| S. 387 | 0 |
| S. 388 | 10 |
| S. 389 | 0 |

In Table XXIII are values obtained of the preventative sporicidal fungicide activity of several of the β-aminoethylaryl ketones.

TABLE XXIII

[Preventative sporicidal activity of S. 558, S. 559 and Zineb against *Uromyces appendiculatus* on beans (16 repetitions per dosage)]

| Product | Concentration of active ingredient, p.p.m. | Average number of uredosores per cm.² (average of 16 repetitions) |
|---|---|---|
| S. 558 | 50 | 0.015 |
| | 25 | 0.1 |
| | 12.5 | 0.8 |
| | 6.25 | 5.5 |
| S. 559 | 50 | 0.03 |
| | 25 | 0.05 |
| | 12.5 | 0.25 |
| | 6.25 | 4.8 |
| Zineb | 50 | 0.05 |
| | 25 | 0.1 |
| | 12.5 | 0.5 |
| | 6.25 | 9.2 |
| Check | | 23.4 |

From the values reported in Tables XXII and XXIII it is evident that the tested products more or less inhibited the development of the bean rust. This particular type of activity is to be ascribed to a direct action against the pathogen and not as an influence on the receptivity of the plant, as it was demonstrated (for some compounds of greater interest) by operating on *U. appendiculatus* spores placed as drops onto slides to let them germinate under conditions similar to those described above in the case of the tests carried out by fumigation "in vivo."

In two tests carried out at different times the results reported in Table XXIV were obtained.

TABLE XXIV

[Preventive sporicidal activity by fumigation exerted "in vitro" by S. 92, S. 192, S. 210, S. 212, S. 236 and S. 300 against *Uromyces appendiculatus* uredospores (10 mg. of active substance administered per 1000 cc. of room volume)]

| Product | Percentage of germination of the uredospores determined after incubation for 20 hours (average of 12 repetitions) |
|---|---|
| 1st test: | |
| S. 92 | 0.6 |
| S. 192 | 0.5 |
| S. 210 | 10.0 |
| S. 212 | 0.7 |
| S. 236 | 2.6 |
| S. 300 | 0.6 |
| Control | 81.5 |
| 2nd test: | |
| S. 236 | 3.4 |
| S. 300 | 1.3 |
| Control | 96.10 |

*Carnation rust* (Uromyces dianthi)

The test for evaluating the preventive sporicidal activity by contact was carried out on carnation leaves, cut at their base, by operating as follows. Both the upper and lower faces of the leaves were sprayed with aqueous solutions or suspensions of the test products. The leaves supported by a net, are placed in boxes containing a layer of distilled water on the bottom, so that the base of each leaf remains immersed to a depth of about 1 cm.

As soon as the sprayed deposits are dried, the leaves are inoculated by spraying with an uredospores suspension (200,000 uredospores per cc.). The boxes are then covered and the contents incubated at 20° C. until the fungus is grown, and the number of uredospores on each leaf is counted. In Table XXV are summarized the results obtained by operating as above.

TABLE XXV

| Product | Disease index referred to the control (considered as 100) average of 10 repetitions | |
|---|---|---|
| | 10 p.p.m. | 5 p.p.m. |
| S. 169 | 3.80 | 6.60 |
| S. 178 | 1.90 | 6.60 |
| S. 192 | 1.98 | 7.92 |
| S. 210 | 0.57 | 1.70 |
| S. 212 | 2.80 | 3.80 |
| S. 215 | 0.60 | 1.30 |
| S. 217 | 1.90 | 2.60 |
| S. 218 | 1.99 | 4.95 |
| S. 219 | 0 | 1.98 |
| S. 220 | 0 | 1.99 |
| S. 236 | 1.14 | 3.99 |
| S. 237 | 0.60 | 2.60 |
| S. 280 | 2.80 | 18.00 |
| S. 300 | 1.98 | 4.95 |
| S. 370 | 3.50 | 5.30 |
| S. 382 | 1.10 | 2.20 |
| S. 383 | 1.40 | 3.50 |
| S. 386 | 0.70 | 2.90 |
| S. 387 | 1.40 | 3.30 |
| S. 389 | 1.10 | 4.00 |
| Zineb | 2.50 | 10.00 |

The fumigation activity of some of the compounds was also determined in respect to *Uromyces dianthi* by operating on single carnation leaves immersed with their base in a vial containing distilled water and incubated in a vessel having a volume of 1800 cc. The bottom of the vessel contained (at the distance of 2–3 cm. from the vials) a filter paper disc with a diameter of 18 cm., impregnated with a 1.5% aqueous solution of the test product (10 cc.). The leaves were infected just before the treatment. The closed vessel is then incubated at 20° C. for 48 hours and then opened at 20–25° C. Under these conditions (8.33 mg. of active substance administered per 1000 cc. of room volume), the following disease percent indexes were obtained:

S. 210—S. 300—S. 192=0
S. 212—S. 236=0.4
Controls=100

*Blue mold* (Peronospora tabacina Adam)

Leaves cut from hydroponic tobacco plants have been used for testing the surface protective activity against *P. tabacina*. The petioles of leaves have been soaked during the entire testing period in a nutritive solution. The contamination of the leaves treated with the compounds to be tested has been achieved by spraying a conidial suspension (about 100,000/cc.) on the upper side of the leaves. The infected leaves have been transferred into a glass bell at 100% humidity and 15° C. Twenty-four hours later the leaves have been taken out from the bell in order to let them dry and then they have been kept at 20° C. and 100% humidity until fructifications have raised. The results have been checked 8 days after the infection by the evaluation of the percentage of the leaf surface covered with the mold.

The results of the above test are given in Table XXVI.

TABLE XXVI

[Protective surface activity of S. 558, S. 559, S. 560, S. 564, S. 565, S. 575, S. 576 and Zineb against *P. tabacina* on detached leaves of tobacco (4 repetitions per dosage)]

| Product | Concentration of active ingredient, p.p.m. | Fungus growth (see below) | |
|---|---|---|---|
| | | Upper surface of the leaf | Lower surface of the leaf |
| S. 558 | 100 | 0 | 0 |
| | 50 | 0 | 0 |
| | 25 | 0 | 0 |
| | 12.5 | 1 | 2 |
| S. 559 | 100 | 0 | 0 |
| | 50 | 0 | 1 |
| | 25 | 1 | 2 |
| | 12.5 | 2 | 3 |
| S. 560 | 100 | 0 | 0 |
| | 50 | 0 | 0 |
| | 25 | 0 | 0 |
| | 12.5 | 1 | 2 |
| S. 564 | 100 | 0 | 0 |
| | 50 | 0 | 0 |
| | 25 | 0 | 1 |
| | 12.5 | 1 | 2 |
| S. 565 | 100 | 0 | 0 |
| | 50 | 0 | 0 |
| | 25 | 0 | 0 |
| | 12.5 | 0 | 1 |
| S. 575 | 100 | 0 | 0 |
| | 50 | 0 | 0 |
| | 25 | 1 | 2 |
| | 12.5 | 2 | 3 |
| S. 576 | 100 | 0 | 0 |
| | 50 | 0 | 0 |
| | 25 | 0 | 1 |
| | 12.5 | 1 | 2 |
| Zineb | 500 | 0 | 0 |
| | 250 | 1 | 2 |
| | 125 | 3 | 4 |
| | 62.5 | 4 | 5 |

0=no growth.
1=sporadic growth.
2=growth on ¼ of the leaf surface.
3=growth on ½ of the leaf surface.
4=growth on ⅔ of the leaf surface.
5=growth on the entire surface.

*Phytotoxicity.*—As concerns the phytotoxicity of the instant parasiticidal compounds (under "phytotoxic" is meant the complex of morphological and physiological changes deriving from the application of the products to the plants), it has been found that most of the tested products do not have any appreciable phytotoxic effect when applied in the concentrations which are useful for a full entdotherapeutic and immunizing action, inside the vegetal tissues.

However, we can not neglect considering the phytotoxic action, if any, occurring from the residues which could possibly remain outside the plant, inasmuch as the phytotoxic activity of the residues could also be modified by reactions caused by atmospheric conditions.

The phytotoxicity of the instant products was therefore evaluated from the results of tests carried out purposely in open field and from careful observations during field tests carried out to determine the preventive and endo-therapeutic and immunizing activities of these products.

The phytotoxicity tests for determining the non-phytotoxic limit dose on some products according to the invention were carried out on flowers and leaves of some cultivated varieties of pears and apples. The products dissolved in distilled water were sprayed over small branches of plants grown in open field, and the phytotoxic effect was evaluated 8 days after the treatment.

Five tests were carried out in May and June, under similar weather conditions in both months. The results are reported in Table XXVII.

TABLE XXVII

[Non-phytotoxic limit dose of a series of β-aminoethylaryl ketones applied in open field on leaves of some cultivated pear and apple varieties]

| Product | Date of treatment | Pears | | | Apples | | |
|---|---|---|---|---|---|---|---|
| | | Butirra clairgeau | Decana d'inverno | Passa crassana | Golden delicious | Rosa Mantovana | Ranetta of Canada |
| S. 210 | 4.5 | 1.25 | 1.25 | 1.25 | 0.62 | 2.50 | 2.50 |
| S. 212 | 4.5 | 0.62 | 1.25 | 1.25 | 0.62 | 5.00 | 10.00 |
| S. 218 | 4.5 | 1.25 | 1.25 | 1.25 | 0.62 | 10.00 | 10.00 |
| S. 211 | 12.5 | 0.62 | 2.50 | 5.00 | 2.50 | 5.00 | 5.00 |
| S. 219 | 12.5 | 1.25 | 1.25 | 5.00 | 5.00 | 10.00 | 5.00 |
| S. 220 | 12.5 | 1.25 | 1.25 | 10.00 | 5.00 | 10.00 | 10.00 |
| S. 205 | 26.5 | 1.25 | 1.25 | 1.25 | 5.00 | 10.00 | 10.00 |
| S. 215 | 26.5 | 1.25 | 0.62 | 1.25 | 5.00 | 5.00 | 5.00 |
| S. 233 | 26.5 | 1.25 | 0.62 | 1.25 | 1.25 | 1.25 | 10.00 |
| S. 280 | 4.6 | 1.25 | 1.25 | 5.00 | 10.00 | 10.00 | 10.00 |
| S. 236 | 4.6 | 1.25 | 1.25 | 5.00 | 10.00 | 10.00 | 10.00 |
| S. 237 | 4.6 | 1.25 | 1.25 | 5.00 | 10.00 | 10.00 | 10.00 |
| S. 300 | 25.6 | 10.00 | 5.00 | 10.00 | 10.00 | 10.00 | 10.00 |
| S. 192 | 25.6 | 1.25 | 2.50 | 2.50 | 2.50 | 10.00 | 10.00 |

When dosages were applied that were higher than the highest non-phytotoxic dosages, circular colored zones only were noted. These zones were more frequent on the lower than on the upper side of the leaves. Moreover, sprayings carried out with 2% aqueous solutions of S. 210 and S. 212 onto apple trees in bloom (cv. Abbondanza) grown on an espalier, caused marginal necrosis on portions of the petals without impairing the thriving. Also phytotoxicity tests carried out on olive leaves and fruits with the various products of the invention in aqueous solutions containing 5% of active substance, did not show any phytotoxic activity 5 days after the treatment.

The phytotoxicity tests on vines of S. 210 and S. 212, which under laboratory conditions have shown the highest antiperonospora activity, were carried out in open field in order to determine the phytotoxic activity, if any, on grapes in different growth stages, with aqueous solutions containing 2% of active substances. The applications were made on vines of the cv. Sangiovese before blooming and immediately after the beginning of grape formation. From repeated observations of the treated vines no phytotoxic effect caused by the tested products was noted.

(3) TOXICITY ON WARM-BLOODED ANIMALS

Tests were carried out to determine the amount of the above products to produce acute toxicity, if any, by ingestion by warm-blooded animals. The research was limited to some compounds (S. 169, S. 210, S. 212 and S. 236), using both sexes of the white albino mouse as test animals. Products S. 210 and S. 212 were sufficiently water-soluble to be administered as solutions in distilled water; S. 169 was administered in a 50-50 solution of water and methylacetamide; S. 236 was administered in aqueous suspension.

From the various tests it appeared that all the products examined did not show any specific toxicity even at the highest dose tested (500 mg./kg. of living animal).

We claim:
1. The process of applying beta-dimethyl-aminoethyl-9-anthranyl ketone picrate to a plant, whereby said plant is immunized to fungus growth.
2. A process of immunizing a plant against fungus growth which comprises applying a beta-dimethyl-aminoethyl-1-naphthyl ketone picrate to said plant.
3. A process of immunizing a plant against fungus growth which comprises applying beta-morpholino-ethyl-4-chloro-1-naphthyl ketone picrate to said plant.
4. A process of immunizing a plant against fungus growth which comprises applying a beta-dimethyl-aminoethyl-4-chloro-1-naphthyl ketone picrate to said plant.
5. A process of immunizing a plant against fungus growth which comprises applying beta-dipropyl-aminoethyl-1-naphthyl ketone picrate to said plant.
6. A process of immunizing a plant against fungus growth which comprises applying beta-morpholino-ethyl-4-chloro-1-naphthyl ketone ferrocyanide to said plant.
7. A process of immunizing a plant against fungus growth which comprises applying beta-morpholino-ethyl-1-naphthyl ketone picrate to said plant.
8. A process of immunizing a plant against fungus growth which comprises applying to a plant a picrate or ferrocyanide of a compound of the formula

$$A-CO-CH_2-CH_2-Y$$

in which A is aryl selected from the group consisting of simple and substituted phenyl, naphthyl, and anthranyl, wherein the substituents are taken from the group consisting of hydroxyl, halo, nitro, alkyl and oxyalkyl; Y is selected from the group consisting of morpholino, piperinino and

in which $R_1$ and $R_2$ are selected from the group consisting of hydrogen and lower alkyl to systemically immunize the plant against fungus growth.

(References on following page)

References Cited by the Examiner

UNITED STATES PATENTS

| | | | |
|---|---|---|---|
| 2,221,931 | 11/1940 | Treboux | 167—22 |
| 2,282,907 | 5/1942 | Horst | 167—33 D |
| 2,283,471 | 5/1942 | Swaine | 167—22 |
| 2,290,174 | 7/1942 | Epstein et al. | 167—22 |
| 2,656,388 | 10/1953 | Schultz | 260—570.5 |
| 2,683,743 | 7/1954 | Moed et al. | 260—570.5 |
| 2,726,265 | 12/1955 | Gregory | 167—30 D |
| 2,927,053 | 3/1960 | Eden | 167—30 |
| 2,941,921 | 6/1960 | Darlington | 167—30 |
| 2,957,800 | 10/1960 | Hopkins et al. | 167—30 |

OTHER REFERENCES

J. Am. Chem. Soc., 64 (1942), 453.
J. Org. Chem., 10 (1945), 259.
J. Org. Chem., 10 (1946), 215.
Org. Sytheses, 1946, vol. 23, page 30.

JULIAN S. LEVITT, *Primary Examiner.*
MORRIS O. WOLK, LEWIS GOTTS, *Examiners.*
GEORGE A. MENTIS, *Assistant Examiner.*